(12) United States Patent
Ward et al.

(10) Patent No.: US 11,538,281 B2
(45) Date of Patent: Dec. 27, 2022

(54) WORKER TASK PERFORMANCE SAFELY

(71) Applicant: Walmart Apollo, LLC, Bentonville, AR (US)

(72) Inventors: Jeffrey Alan Ward, Casa Grande, AZ (US); Andrew B. Millhouse, Gilbert, AZ (US)

(73) Assignee: Walmart Apollo, LLC, Bentonville, AR (US)

( * ) Notice: Subject to any disclaimer, the term of this patent is extended or adjusted under 35 U.S.C. 154(b) by 884 days.

(21) Appl. No.: 16/114,197

(22) Filed: Aug. 27, 2018

(65) Prior Publication Data

US 2019/0122036 A1 Apr. 25, 2019

Related U.S. Application Data

(60) Provisional application No. 62/574,976, filed on Oct. 20, 2017.

(51) Int. Cl.
*G06K 9/00* (2022.01)
*G06V 40/20* (2022.01)
*G06Q 10/06* (2012.01)
*G09B 19/00* (2006.01)

(52) U.S. Cl.
CPC ....... *G06V 40/23* (2022.01); *G06Q 10/06393* (2013.01); *G06Q 10/06398* (2013.01); *G09B 19/003* (2013.01)

(58) Field of Classification Search
CPC ...................................................... G06K 9/00
See application file for complete search history.

(56) References Cited

U.S. PATENT DOCUMENTS

| 8,115,650 | B2 | 2/2012 | Dasilva et al. |
| 8,253,564 | B2 | 8/2012 | Lee et al. |
| 8,446,273 | B2 | 5/2013 | Humphrey et al. |
| 8,477,021 | B2 | 7/2013 | Slack |
| 9,230,419 | B2 | 1/2016 | Beggs et al. |
| 9,256,906 | B2 | 2/2016 | Amigo et al. |

(Continued)

OTHER PUBLICATIONS

Unknown, "From Desert Strom to the retail store: Five technologies that are closing global supply chain gaps", Technology—CSCMP's Supply Chain Quarterly, 2015, http://www.supplychainquarterly.com/topics/Technology/20151228-five-technologies-that-are-closing-global-supply-chain-gaps/, 5 pages.

(Continued)

*Primary Examiner* — Kurtis Gills

(57) ABSTRACT

Examples provide analyzing motion data. Worker specific sensor data is received and both a task and at least one worker movement based on the received worker specific sensor data are identified. At least one task threshold parameter associated with the identified task and ergometric data for a worker related to the identified task is retrieved and at least one worker specific task parameter based on the received worker specific sensor data is generated. The at least one task threshold parameter is compared with the at least one worker specific task parameter and the at least one worker movement is compared with the ergometric data for the worker related to the identified task. Worker specific task data is generated based on the comparison and a change for future worker movement is identified based on the comparison.

19 Claims, 5 Drawing Sheets

(56) References Cited

U.S. PATENT DOCUMENTS

| | | | |
|---|---|---|---|
| 9,311,603 B2 | 4/2016 | Martin et al. | |
| 9,424,749 B1 | 8/2016 | Reed et al. | |
| 2006/0226973 A1 | 10/2006 | Catlin | |
| 2009/0070163 A1* | 3/2009 | Angell | G06Q 10/04 |
| | | | 705/7.26 |
| 2010/0241465 A1 | 9/2010 | Amigo et al. | |
| 2012/0289217 A1 | 11/2012 | Riemer et al. | |
| 2014/0114699 A1 | 4/2014 | Amigo et al. | |
| 2015/0156567 A1 | 6/2015 | Oliver et al. | |
| 2016/0125348 A1 | 5/2016 | Dyer et al. | |
| 2016/0171862 A1 | 6/2016 | Das et al. | |
| 2017/0072568 A1 | 3/2017 | Hitchcock et al. | |
| 2017/0091870 A1 | 3/2017 | Trainor et al. | |
| 2017/0245806 A1* | 8/2017 | Elhawary | A61B 5/681 |
| 2017/0296129 A1* | 10/2017 | Petterson | A61B 5/0022 |

OTHER PUBLICATIONS

Unknown, "What Is Internet of Things (IoT)", Jayblues Blog, JayBlues Technologies, Jan. 19, 2017, http://jayblues.com/blog/blog/2017/01/19/what-is-internet-of-thingsiot/, pp. 1-25.

Unknown, "Predicting and Preventing Safety Incidents", captured Jul. 18, 2012, http://www.ehstoday.com/safety/don-t-investigate-safety-incidents-predict-and-prevent-them. pp. 1-20.

Young, Lee W., International Search Report, International Application No. PCT/US2018/048204, dated Nov. 1, 2018, 2 pages.

Young, Lee W., Written Opinion, International Application No. PCT/US2018/048204, dated Nov. 1, 2018, 6 pages.

* cited by examiner

WORKER TASK PERFORMANCE SAFELY

BACKGROUND

Workers may perform physical activities or task while working at retail locations, distribution centers, etc. Because of the nature of the physical activities, such as repeated lifting and moving, workers may be susceptible to injury over time. For example, if improper lifting techniques or unsafe equipment handling techniques are used, the likelihood of injury to the worker over time can increase. In many instances, the worker may not even be aware of the unsafe lifting or unsafe operation of equipment that he or she is performing, which can also create an unsafe working environment for others. Accordingly, the incidence of worker injury can increase, resulting in loss of work time and/or decreased productivity. In some instances, certain unsafe actions may also result in safety violations.

SUMMARY

Examples of the disclosure provide a system for improving worker task performance safety. The system includes at least one transceiver, at least one processor communicatively coupled to the transceiver and at least one memory communicatively coupled to the at least one processor, comprising computer program code. The at least one memory and the computer program code are configured to, with the at least one processor, cause the system to receive worker specific sensor data at the at least one transceiver, identify both a task and at least one worker movement based on the received worker specific sensor data, retrieve at least one task threshold parameter associated with the identified task and ergometric data for a worker related to the identified task, and generate at least one worker specific task parameter based on the received worker specific sensor data. The at least one memory and the computer program code are configured to, with the at least one processor, further cause the system to compare the at least one task threshold parameter with the at least one worker specific task parameter, compare the at least one worker movement with the ergometric data for the worker related to the identified task, generate worker specific task data based on the comparison of the at least one task threshold parameter with the at least one worker specific task parameter and identify a change for future worker movement based on the comparison of the at least one worker movement with the ergometric data for the worker related to the identified task.

Other examples provide a system for improving worker task performance safety. The system includes a plurality of sensors at a plurality of different locations, the plurality of sensors configured to capture worker specific motion data for a plurality of workers at the plurality of different locations and at least one memory to store the captured worker specific motion data and safety metrics. The system further includes a safety monitoring server configured to receive the captured worker specific motion data, the safety monitoring server comprising at least one processor, with the at least one memory communicatively coupled to the at least one processor and comprising computer program code. The at least one memory and the computer program code are configured to, with the at least one processor, cause the system to analyze the captured worker specific motion data from the plurality of different locations and the safety metrics to determine a safety level for each of the plurality of different locations and identify at least one of potential solutions, safer methods or possible changes at a location level to be made based on an aggregation of the captured worker specific motion data from the plurality of locations.

Still other examples provide a method for improving worker task performance safety implemented on at least one processor. The method includes receiving worker specific sensor data via a communication network coupled to the at least one processor, identifying both a task and at least one worker movement based on the received worker specific sensor data, retrieving at least one task threshold parameter associated with the identified task and ergometric data for a worker related to the identified task from at least one memory communicatively coupled the processor and generating at least one worker specific task parameter based on the received worker specific sensor. The method also includes comparing the at least one task threshold parameter with the at least one worker specific task parameter, comparing the at least one worker movement with the ergometric data for the worker related to the identified task, generating worker specific task data based on the comparison of the at least one task threshold parameter with the at least one worker specific task parameter and identifying a change for future worker movement based on the comparison of the at least one worker movement with the ergometric data for the worker related to the identified task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable safety monitoring and remediation of actions that could potentially be unsafe. In some examples, user-specific and/or location-based safety metrics for a monitored area are determined to identify potential unsafe worker activities, such as in the performance of specific tasks, or to identify potential unsafe locations within the area. This may include determining safety metrics across monitored areas to identify solutions for unsafe worker activities or unsafe areas. Further, in one example, warehouse motions, activities and events across multiple locations are monitored to identify safety trends and predict unsafe environments, which may include the potential continued unsafe performance of a task by a specific worker. This monitoring enables the identification of remedial actions and/or other solutions for potentially unsafe worker task performance and/or potentially unsafe areas in a facility.

Thus, in some examples, activities and/or events are captured and analyzed, which may be specific to a particular worker or across multiple locations, to identify safety trends and predict potentially unsafe work task performance (e.g., repeated unsafe lifting) and/or unsafe environments. Ergometric data may be used in some examples to identify potentially unsafe tasks being performed by a worker and to identify possible changes in how the task is to be performed in the future. In some examples, worker's safety and accident trends and/or incident reports may be used to predict accident circumstances for the worker based on different analytic metrics. Different devices, including a wearable device on the worker and/or a mobile or handheld device, such as for a manager, both having sensors, are used in some examples to monitor safety metrics to identify potentially unsafe conditions (e.g., display an identified worker's profile data for a worker located near a manager, such as historical accidents, safety training background, etc.). Using the analyzed safety data, safety issues related to the worker or safety issues related to monitored zones within a facility may be identified by predicting potential accident circumstances. This enables improved worker task performance safety and reduction in potentially unsafe conditions.

Figure 1:
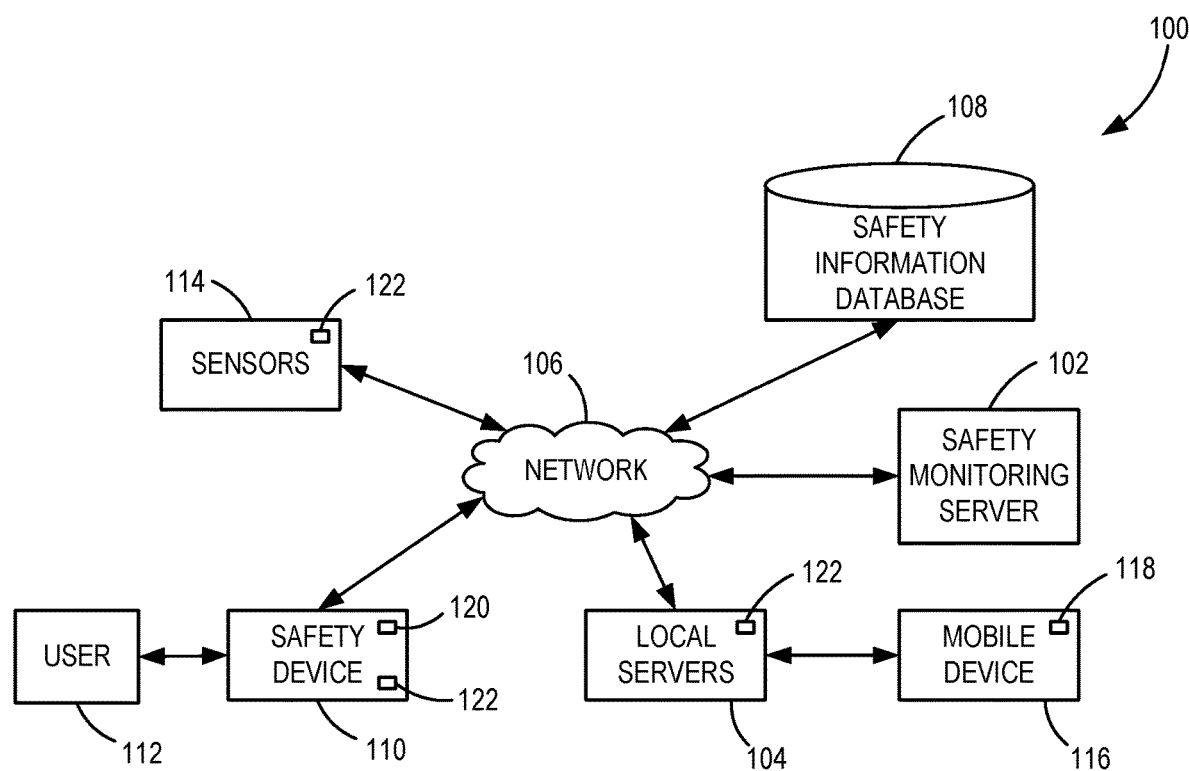
FIG. 1 is an exemplary block diagram illustrating a system for processing motion data.

FIG. 1 illustrates a system 100 for monitoring activities and/or tasks of workers across one or more locations according to an embodiment. The system 100 includes a safety monitoring server 102 and one or more local servers 104, both connected to a network 106. A safety information database 108 is also connected to the network 106. Finally, one or more safety devices 110 (worn by one or more users 112) and one or more sensors 114 are connected to the network 106.

It should be understood that the network 106 may comprise the Internet, an intranet, a private network, a public network, or some combination thereof. The safety monitoring server 102, local servers 104 and safety devices 110 may each include one or more computing devices (e.g., personal computers, laptop computers, tablets, etc.) that include network interfaces with which to connect to the network 106. The safety information database 108 may be housed within or as a part of a computing device, such as the safety monitoring server 102. Alternatively, the safety information database 108 may be located apart from the safety monitoring server 102 and/or the other components of system 100. Further, the safety information database 108 may be stored within a single memory device or may be distributed across multiple memory devices and/or distributed across multiple geographic locations.

In operation, the safety monitoring server 102 monitors activities, such as tasks being performed by the user 112, using monitored or sensed data received from the safety device 110 or sensors 114. It should be noted that the sensors 114 may also be worn by the user 112 (as part of the safety device 110 in some examples), located in proximity to the user 112 or attached to equipment (e.g., forklift) that the user 112 is operating. The monitored or sensed data may initially be processed by the local servers 104 to provide real-time or near real-time safety monitoring of a particular facility (e.g., retail location or distribution center) based on the activities of one or more users 112, which in this example are workers within the facility.

In one example, the system 100 is configured to provide analytics for worker safety (wherein the user 110 is a worker), such as for workers at a distribution center where products (which may be packaged in pallets) are moved by the workers manually or with the use of equipment (e.g., powered machinery). The system 100 is able to monitor the activities of the workers, whether performed manually or with the equipment. It should be noted that one or more examples described herein may be used together or independently. Thus, monitoring may be performed for a single facility or multiple facilities and includes monitoring of individual workers activities, the activities of groups of workers, the activities performed within a particular monitored area or zone, etc. Additionally, the activities may be related to tasks that are performed manually by the worker (e.g., lifting and placing boxes on a shelf in a retail store or distribution center) or by use of equipment (e.g., movement of pallets within a distribution center with a forklift).

In some examples, the system 100 provides worker safety analytics that support managers to address safety issues with the user 112, for example a worker within a distribution facility. For example, analytics information, such as worker safety information may be provided to the manager on a mobile device 116 that is connected to the one or more local servers 104. In one example, the mobile device 116 is a handheld device that includes a proximity sensor 118 to identify a user 112 that is within proximity to the mobile device 116, for example the closest user(s) 112 to the handheld device 116. The proximity sensor 116 may determine the identity of the closest user 112 based on communication between the mobile device 116 and the safety device 110, which transmits a user identification signal. In other examples, radio-frequency identification (RFID) technology may be used to identify the location of the user 112 relative to the mobile device 116. Any type of location detection technology may be used, such as any beaconing technology (e.g., long range Bluetooth®, Wi-Fi positioning or indoor positioning systems that locate objects or people using radio waves, magnetic fields, acoustic signals or other sensory information). In still other examples, inventory systems which track user actions by location may be used. However, such location tracking is only accurate, for example, while an associate is managing inventory. In some examples, different location detection systems and methods may be used, including a combination of the systems and methods.

In one example, the mobile device 116 is configured to display the safety and accident history of the user 112 (e.g., associate) to enable the manager to address these issues with the user 112. The system 100 can also help the manager identify a user 112 who is trending towards unsafe behaviors and a potential accident. For example, the safety monitoring server 102 is configured in some examples to monitor and analyze location wide (e.g., distribution center wide) safety trends and predict a potential next accident circumstance. The manager may use this prediction to take action on specific safety coaching to avoid the circumstances. The manager may also use the mobile device 116 to log observed unsafe activities such as, not coming to a complete stop upon exiting a trailer or not honking the horn upon entering a breezeway when the user 112 is operating a forklift.

In some examples, individual user safety metrics are determined and analyzed by the safety monitoring server 102 based on information acquired by the safety device 110. This operation enables monitoring user safety, which may include individualized analysis and recommendations for changes in the way the user 112 performs a particular task. For example, the safety device 110 may be configured to monitor the actions (e.g., movements during performing tasks) of the user 112. The safety device 110 can track the activities of the user 112 using one or more monitoring devices 120 that can monitor the user 112 as the user 112 performs various tasks through a work shift (e.g., monitor the lifting and placing of packages to determine whether the lifting and placing is being performed correctly to avoid injury to the worker and/or others).

In one example, the monitoring devices 120 of the safety device 110 that is worn by the user 112 tracks the mechanics that the user 112 employs when performing different tasks, such as during lifting and placing tasks. In some examples, the safety device 110 is configured to track overall or total task performance, such as the number of lifts per pallet or per shift, and determine not only how safely the user 112 performed the tasks, but also how efficiently the user 112 is working (e.g., is the user 112 placing a container on a pallet and then repeatedly having to re-position the same container after subsequent picks). In this example, the system 100 provides next level statistics based on the movements of the user 112, which may also include providing alerts (e.g., audible or visual alerts from the safety device 110) when a task is not being performed in a defined correct manner (e.g., the worker is making an unsafe lift as determined based on monitored motion of the user 112 by the monitoring devices 120). The system 100 may generate a score for the user 112 based on the safety and/or efficiency of the work, including the tasks performed by the user during his or her shift, over the entire week or month, etc. For example, the score may be based on a comparison of the how other users performed similar tasks (e.g., how safe or efficiently the tasks were performed). In some examples, a user score is aggregated based on a weighted average where the weight is based on the priority of the metric, which may include a score having a range from 0-100 points. The priority of the metric may be defined based on the particular task being performed, the user, the facility, etc.

Thus, the system 100 in various examples is configured to provide improved worker task performance safety or facility worker safety. The system 100 may accomplish the monitoring and analysis of received sensor data locally or remotely. For example, part or all of the analysis may be performed at the safety monitoring server 102, the local servers 104, the safety device 110 and/or the mobile device 116. The processing of received sensor data by these components may be performed simultaneously, concurrently or sequentially. In some examples, one or more of these components receive worker specific sensor data from the safety device 110 or sensors 114 using, for example, one or more transceivers 122 and/or via the network 106.

In one example, the system 100, for example, one or more of the safety monitoring server 102, the local servers 104, the safety device 110 and/or the mobile device 116, identify at least one of a task (e.g., a lifting and placing task associated with shelving merchandise) and at least one worker movement based on the received worker specific sensor data. The identification of the task may be based on the worker movement (e.g., automatically identifying the task based on movements that match a movement model or template for known or defined tasks).

The system 100 then accesses the safety information database 108 to retrieve at least one task threshold parameter associated with the identified task and ergometric data for a worker related to the identified task. The task threshold parameter and the ergometric data may be retrieved based on the identified worker movement. For example, the task threshold parameter may define maximum safe movement ranges, a maximum safe lifting weight based on the user's profile, a maximum safe number of lifts, etc. In some examples, a series of similar or related tasks may be used to define the task threshold parameter, which may reduce the potential for repetition injuries. Additionally, the ergometric data may relate to specific ergometrics for the worker, such as defined based on parameters specific to the worker that define worker profile (e.g., age, height, weight, sex, etc.). Other examples of ergometric data may be summarized or normalized data, such as average pulse, average movements per hour, etc.

Based on the received worker specific sensor data, the system 100 generates at least one worker specific task parameter. For example, the system 100 may generate the worker specific task data that includes at least one of a worker performance indicator, a task performance indicator, a task performance adjustment recommendation, an update to a worker performance log, and a safety alert based on the comparison, among others.

The system 100 then generates at least one worker specific task parameter based on the received worker specific sensor data. The system 100 then compares the at least one task threshold parameter with the at least one worker specific task parameter, and compares the at least one worker movement with the ergometric data for the worker related to the identified task. Based on the comparison of the at least one task threshold parameter with the at least one worker specific task parameter, the system 100 generates worker specific task data and/or based on the comparison of the at least one worker movement with the ergometric data for the worker related to the identified task, the system 100 identifies a change for future work movement. For example, as described in more detail herein, the system 100 may generate information for a manager to use to address a safety concern of a nearby worker or coach the nearby worker on proper safety protocols, or alert the worker to an unsafe movement (as well as identify a change to the movement to improve worker safety). In this example, the generated information may be transmitted in real-time to the safety device 110 or mobile device 116 as a visual, audible and/or haptic notification. In one example, the safety device 110 is a worker device and the mobile device 116 is a manager device.

In some examples, the system 100 maintains a log of worker specific task data associated with a plurality of workers (which may be stored in the safety information database 108), determines aggregated worker performance data in a specific area based on the log of worker specific task data associated with the specific area and determines whether the aggregated worker performance is impacted by at least one condition associated with the specific area. For example, based on changing conditions in the specific area (e.g., movement of workers or equipment) or the actions of the workers in the area, a determination may be made that a potentially unsafe condition is likely to occur that may result in injury to the worker.

It should be noted that the safety monitoring by the system 100 may be performed by the above-described processes iteratively or periodically to ensure a safe working environment, as well as safe movements by the worker. As a result of each iteration of the performance of the processes, the system 100 generates, in some examples, at least one of a worker performance indicator, a task performance indicator, a task performance adjustment recommendation, an update to a worker performance log, a safety alert, worker safety data, worker accident data, worker performance data, and worker injury data, among others. This generated information may be stored in the safety information database 108.

Thus, for example, a worker performance log may be updated repeatedly to update predictive trends associated with the performance of the worker based on an analysis of the worker performance log or to update identified changes for the workers movements. In some examples, a baseline is established for motions and performance by a safety consultant. Deviations from this baseline that exceed an established threshold generate the alerts and corrective actions as described herein. For example, if the baseline for bending at the waist is 45 degrees and the allowed average deviation is 10%, a user (e.g., worker or associate) bending at 40 degrees on average (12.2% deviation) is alerted to their unsafe activity and informed to bend less at the waist. Additionally, the average deviation threshold may be set to any desired or required value, such as +25% or −10% if less bending is preferred to more bending.

Figure 2:
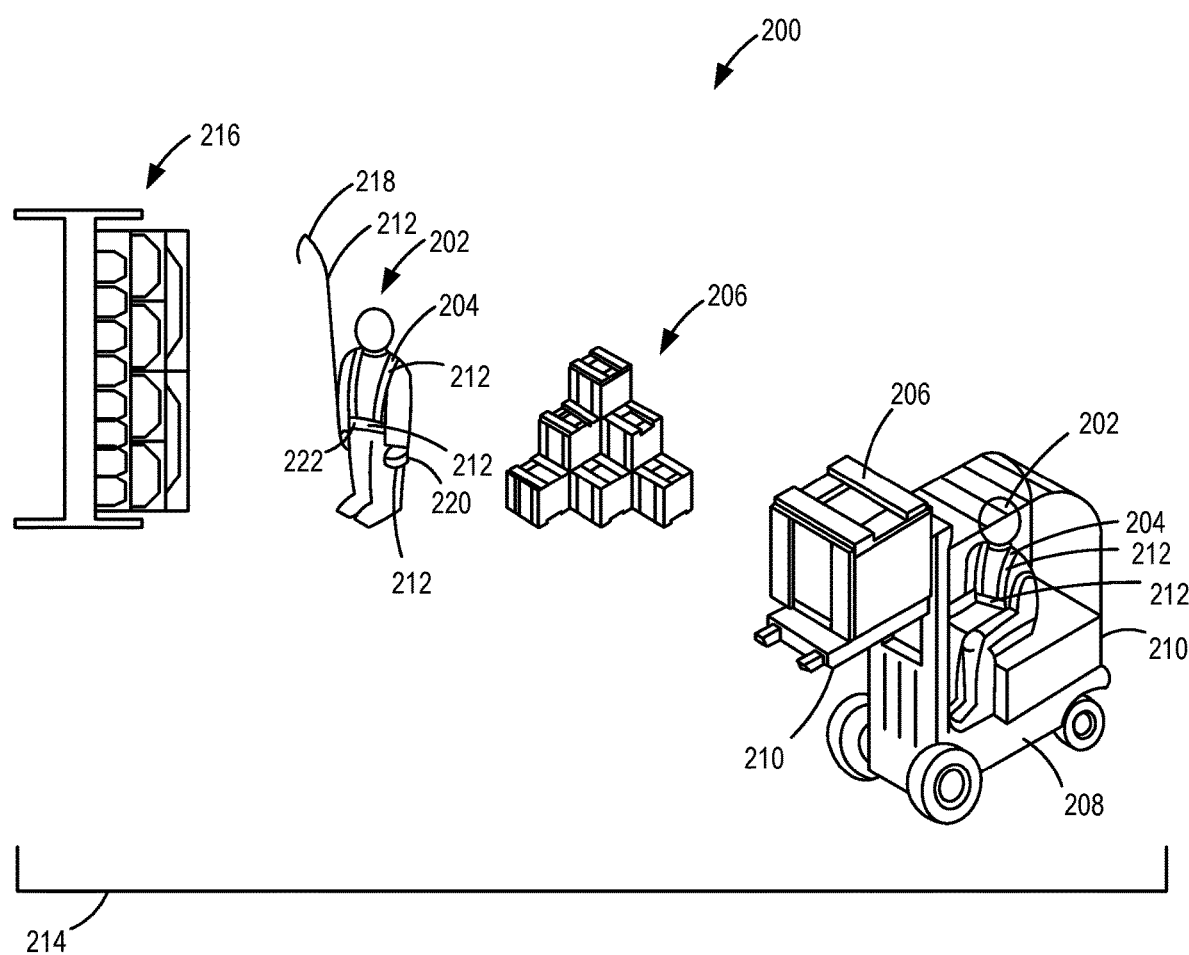
FIG. 2 is another exemplary diagram illustrating an environment in which motion data is captured for processing.

Thus, for example as illustrated in FIG. 2, illustrating a warehouse setting 200, a worker 202 may be monitored while performing tasks using a wearable safety device 204, which may be attached to or integrated as part of a suspender system or safety belt that the worker 202 wears. In this illustrated example, the worker 202 is manually moving and placing containers 206 onto a shelf 216. This movement and placing of the containers 206 may be performed, for example, when restocking shelves in a retail setting (e.g., moving or placing merchandise) or moving and placing containers in a warehouse, such as a distribution center. It should be noted that while the worker 202 is shown being monitored while manually performing the movement and placing, the system 100 (shown in FIG. 1) may be used to monitor the worker 202 while moving a container using equipment, illustrated as a forklift 208. In this example, the worker 202 may still be wearing the wearable safety device 204, but the forklift 208 also includes one or more sensors 210 that monitor the operation of the forklift 208.

In some examples, the wearable safety device 204 includes one or sensing or monitoring devices 212 that acquires worker specific sensor data (e.g., motion data), and which may include an accelerometer, a gyroscope, a suspender system, a tensile sensor, a location sensor, an infrared sensor, image/video-based motion sensors (e.g., Microsoft Kinect®), and an ambient air temperature or ambient body temperature sensor, among others. Additionally, in some examples, the sensors 110 acquire equipment specific sensor data, which may include, speed sensors, weight sensors, locations sensors and altitude sensors, among others. As should be appreciated, these sensing or monitoring devices 212 and one or more sensors 210 may be attached to or embedded within the wearable safety device 204 or the forklift 208, respectively. For example, the sensing or monitoring devices 212 may be attached to or embedded within a worker belt, a worker glove, a worker shoe, a worker apparel, a clip-on sensor device, the wearable safety device 204, and the sensors 210 may be attached to or embedded within workplace equipment, such as the forklift 208. As other examples, various embodiments may be implemented in connection with any type of wearable device, such as a smart watch, headband or smart glasses, among others. The various monitoring and sensing components may be of the same type or different types.

In some examples, the sensor data may be belt sensor data that transmits sensor readings every time there is a lift or provide a live feed to the local server 104 that determines when an action, such as lifting is being performed (e.g., analyze movement data to identify type of movement, identify lift, walk, push, etc.), which then logs the event(s) and summarize(s) the events using parameters for "good" vs "bad" motion (e.g., safe lift, unsafe lift), or may gauge the lift (e.g., 80% proper lift based on movement analysis). In one example, if the monitoring devices 212 are sensors, such as an accelerometer, gyroscope and/or suspender system, an amount of effort exerted by the back versus legs/hips may be determined. In another example, the monitoring devices 212 include one or more tensile sensors to detect an amount of tension/force exerted.

While operating equipment, such as the forklift 208, the sensors 210 may track the rate of speed of the forklift 208 including determining (based on defined safety parameters), whether the worker 202 is operating the forklift 208 in an unsafe manner, such as by turning corners too fast, not coming to a complete stop before exiting equipment, not coming to a complete stop where there is cross traffic or blind spots, among others. This determination may be performed, for example, by analyzing the velocity of movement and direction of movement. In some examples, a location-aware aspect may be provided in the belt to determine where the user/wearer is in a monitored zone 214 (e.g., GPS or Wi-Fi location detection).

It should be noted that the sensor information may be any type of information that allows the system 100 to monitor the activities of the worker 202 to assess safety conditions, which may include predicting a possible unsafe condition to the worker 202 or within a monitored zone 214 of a facility and/or to identify a change in the activities to reduce the likelihood of an unsafe condition (e.g., to change the motion of the movement of the worker 202 when lifting or to change the speed at which the worker 202 turns the forklift 208 or approaches the shelf 216).

In other examples, the system determines whether the worker is properly placing the containers 206 on the shelf 216. For example, a determination may be made as to whether the worker 202, when reaching into tall slots (e.g., higher on the shelf 216) is using proper safety protocols, including climbing onto a step or using a pole hook 218. In one example, a sensor 212 may be attached to or incorporated with the pole hook 218 to identify when the pole hook 218 is being used. The sensor 212 of the pole hook 218 is configured to communicate and interact with the wearable safety device 204 (which may include the safety device 110 shown in FIG. 1) in a master/slave arrangement so that the safety device 204 can sense when the pole hook 218 is being used.

As another example, a sensor 212 attached to or incorporated with a glove 220 that the worker 202 is wearing is configured to determine when the worker 202 is reaching too far. For example, sensor data from the sensor 212 of the glove 220 may be used to determine how far the worker 202 is reaching relative to a midline of the body, communicating with the safety device 204 (e.g., a belt portion 222) which is at the midline, such that a degree and/or distance of the sensor 212 in the glove 220 from the sensor 212 in the belt portion 222 of the safety device 204 may be determined.

As another example, the safety device 204 may be configured to detect movement of the arms of the worker 202 using relative positions of monitoring devices 212 on the worker 202 (which may include distance detection sensors). Thus, the worker 202 when moving a container 206, if instead of holding under the container 206, the worker 202 clamps the container 206 by compressing his or her hands on the sides of the container 206 to lift the container 206, this condition is identified as potentially unsafe as causing more strain than lifting from underneath. In another example, the monitoring devices 212 are configured to sense whether the elbows of the worker 202 are at the sides of the worker 202 or extended during a lift of the container 206 and identify when the elbows are extended. For example, the monitoring devices 212 may be configured to sense a degree of distance between the glove 220 and belt portion 222 of the safety device 204. In general, during a lift, it is safer to have arm at the sides of the worker 202 to prevent arm/back injuries. In still other examples, the monitoring device 212 on the front of the belt portion 222 of the safety device 204 may be an infrared (IR) sensor configured to detect a proper squat of the worker 202 based on whether the knees of the worker 202 are in field-of-view (FOV) of IR sensor.

Thus, in various examples, real-time feedback is provided through the safety device 204. For example, when the worker 202 starts a lift, the analysis by the system 100 (shown in FIG. 1) is performed in real-time based on the sensor data received from the monitoring devices 212 to quickly inform the worker 202 that he or she is going into a lift wrong and should correct the lift before completing the action.

Figure 3:
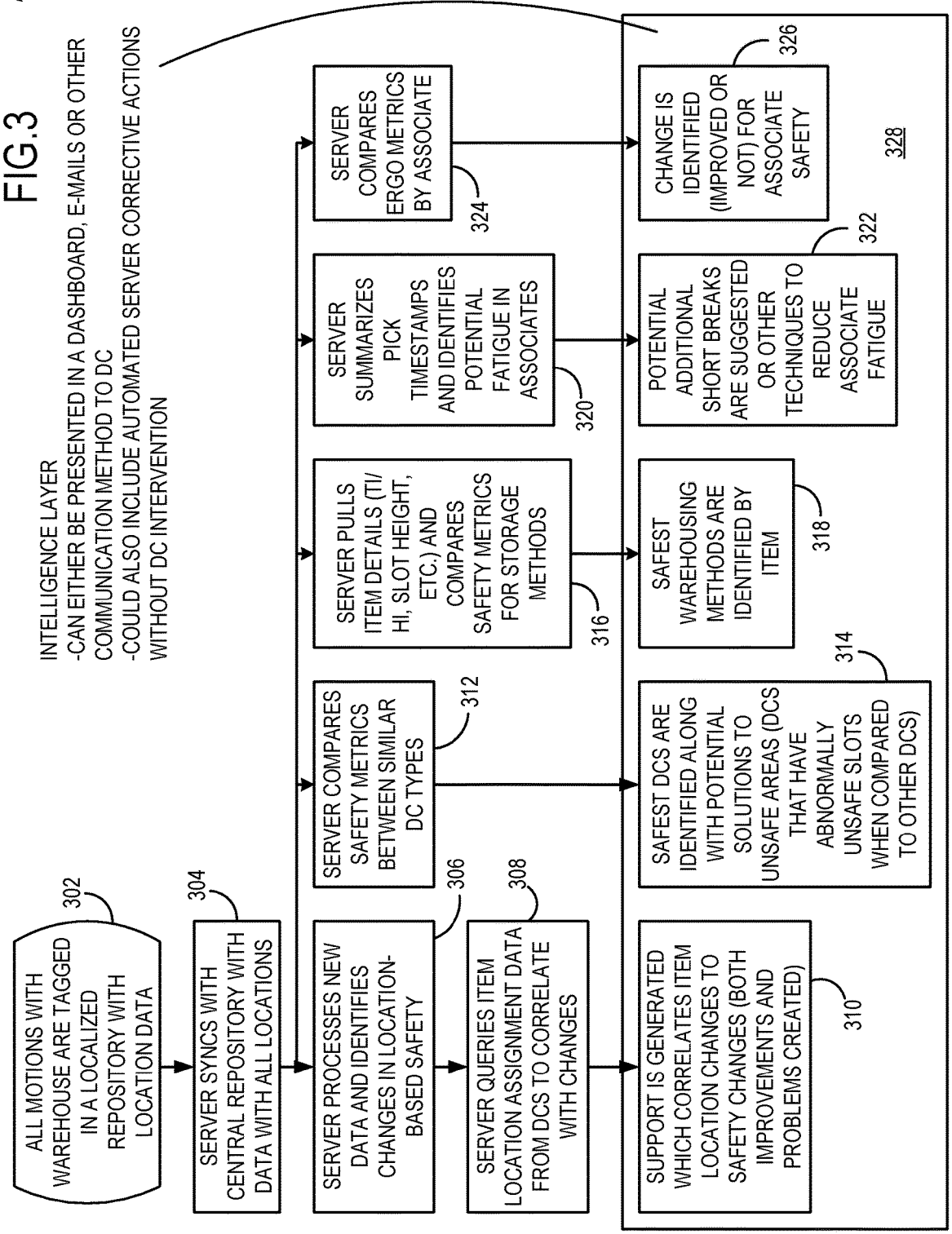
FIG. 3 illustrates a diagram of operations performed to analyze motion data and generate outputs.

FIG. 3 illustrates a diagram 300 of operations and interactions between components (e.g., the components in the system 100 shown in FIG. 1) according to one example. With reference now to the processes illustrated in FIG. 3 (and with continued reference to FIGS. 1 and 2), motions of a worker (e.g., the user 112 or worker 202) within a facility (e.g., a warehouse) are logged at 302 in a localized repository with location data (e.g., in the local servers 104 or in memory of the safety device 110). For example, a time-stamped log of a user's location is maintained, which may also include location-based analytics of safety issues. Using this information, a determination may be made as to one area of a warehouse where there are workers constantly lifting incorrectly to allow an analysis of why this is occurring, such as because of the way in which containers 206 are oriented, obstructions that present, etc. The motions that are logged may also be used to provide information and analytics on other issues that can be improved beyond worker behavior and that are causing incorrect actions, which can lead to unsafe conditions, resulting in injury. For example, as described herein, the logged motions (and in general, activity information), may be used to analyze trends leading up to unsafe conditions (e.g., injuries) to identify actions and/or motions that lead to the unsafe conditions in order to prevent or reduce the likelihood of the conditions occurring in the future. It should be noted that the motions that are logged at 302 may be physical motions of the worker or motion caused by the worker, such as when driving the forklift 208. Also, the motions logged may include different types of information regarding the motion, including movement information such as the velocity, direction, angle, etc. of the motion.

The server then synchronizes with a central repository with data from one or more locations at 304. For example, logged motion information from a local server 104 may be communicated to the safety monitoring server 102 and stored in the safety information database 108. The logged motion information may be communicated periodically, such as at predefined time periods, after a certain number of motions have been logged, etc. In general, at 304 motion information is gathered from one or more locations (e.g., different locations within a warehouse or different warehouses) for processing to return analytics, such as for the individual worker 202 wearing the safety device 204.

More particularly, the server processes new data (e.g., motion data acquired since the last update) at 306 to identify changes in the location-based safety and/or individual worker-based safety. For example, the server may determine new unsafe conditions or rectified previously unsafe conditions by comparing the new data in combination with the stored data (e.g., combining motion data on user-wise basis or location-wise basis) with defined safety thresholds. In one example, the server queries item location assigned data from multiple locations, such as multiple distribution centers (DCs) at 308 in order to correlate the changes. For example, motion data for each of the locations is separately compared and updated. A report is then generated at 310, which correlates item location changes to safety changes. In some examples, this correlation includes both improvements in unsafe conditions and new problems created that could result in unsafe conditions. For example, locations having a score exceeding an average deviation threshold flags these locations as potential unsafe locations. In some examples, if the system identifies unsafe reaches, bends, weight lifting, etc. at a specific location (over a period of time) that exceeds the pre-defined average deviation threshold defined by the safety consultant, this results in an alert bring provided to managers and/or quality assurance workers of the condition so that the condition can be investigated and remedied.

The motion information may be analyzed to determine changes in the motion information for particular tasks, such as incremental improvements in the motions based on task based safety thresholds (e.g., maximum allowed motion, maximum allowed lift weight, distance from shelf 216 when lifting and placing the container 206, etc.). The updated motion data may be analyzed based on an aggregated value or average values over time.

The server also compares safety metrics between similar location types (e.g., from similar DCs) at 312. For example, motion information for similar tasks from different locations may be analyzed to determine a variance between locations and from a preferred or suggested motion value. The comparison may be based on task codes or task parameters that are defined for specific operations that are performed at like type warehouses. These similar warehouses may be defined by the type of warehouse, the configuration of the warehouse, the types of containers 206 being moved, etc.

The server then identifies the safest locations at 314 (e.g., safest DCs) along with potential solutions to unsafe areas. For example, solutions may be identified for DCs that have abnormally unsafe slots when compared to other DCs, such as based on a safety score determined as a variance from an acceptable number of exceptions (e.g., a number of times the motion data has exceeded a safety threshold for a task or task set in a predefined period of time). In some examples, the safest DCs are identified as the DCs with the least number of motion events that exceed a safety threshold, and based on a comparison of how the less safe DCs are operating compared to how the safer DCs are operating, recommendations for changes to the motions may be provided to the less safe DCs. For example, a preferred travel route for the forklift 208 or a particular lifting method for a certain task may be identified that is safer, and in some instances, may result in increased overall efficiency.

The server may also pull item details from the motion information at 316 and compare safety metrics for different storage methods. For example, the motion sequence and timing for a particular operation (e.g., stacking particular items) may be analyzed across different DCs, which may include analyzing particular details (e.g., TI/HI, slot height, etc.) for the operation. Based on the analysis, such as by determining the sequence of motions and timing (which may be a combination from different DCs), safest warehouse methods are identified by item at 318. For example, for each particular aspect of a task, a safest motion may be determined.

The server also summarizes pick timestamps and identifies potential fatigue in workers at 320. For example, based on the amount of time taken to perform a particular task, or motions within the task, compared to the time taken at different facilities or by different workers (e.g., an average or mean time for the task), if the time is over a defined threshold, potential fatigue is thereby identified. In response, the server suggests potential additional breaks (e.g., short breaks during the work shift or during performing of a long task) or other techniques to reduce worker fatigue at 322. For example, timed breaks at certain intervals may be determined to reduce worker fatigue and improve efficiency based on a historical analysis of performing the task or performing multiple tasks during a work shift with defined break times and intervals.

The server also compares ergometrics of worker at 324. For example, as described herein, individual worker motions may be analyzed and compared to preferred or suggested motions that result in safe task performance. For example, one or more medical or workplace guidelines for proper lifting procedures may be used to determine whether worker-specific ergometrics are within the guidelines. Worker specific motions for one or more tasks may be compared to ideal or preferred motions and based on a difference (e.g., a difference in speed, angle, etc.), if the motions are within predefined limits, then the motions are considered to be safe. However, if the motions are not within the predefined limits, then the motions are considered to be unsafe (e.g., potential for injury exists) and the server identifies a change, such as in all or part or the motion or timing or the motion for the particular worker at 326. The change in some examples is a suggested change that may result in improved overall safety and/or may result in improved overall efficiency.

For example, using a safety device (e.g., sensor is a belt, glove and/or shoe), based on the gathered motion data, the server processes and returns analytics for the individual worker for one or more tasks based on defined thresholds to identify unsafe behaviors. As described herein, the safety device 110 or 204, or the mobile device 116, may have visual, audio or haptic feedback that may output an alert based on the analysis and thresholds. As should be appreciated, the alert may be provided in real-time while the worker is improperly or unsafely performing the task in order to attempt to stop the task being performed or change how the task is performed in the future.

In some examples, data storage for sets of sensor readings, such as the motion information, is cached until the data is analyzed. In one example, based on the comparison at 324, a key performance indicator (KPI) is generated and then the cached data is purged until a next set of data is acquired and stored. The KPI may be a score based on the degree of safety of the various tasks performed by the worker. It should be noted that in some examples, the KPI is generated for each worker based on the analyzed data and the determined safest way to do a particular task is identified for the worker based on factors specific to the worker, such as age, height, weight, sex, time on job, etc. As should be appreciated, using the wearable safety device 110, 204, motion data may be captured and analyzed to determine a KPI for each worker that defines a history of individual performance.

Thus, at 310, 314, 318, 322 and 326 the server generates an output that generally defines an intelligence layer 328. In some examples, the intelligence layer 328 generates outputs that may be presented in different forms, for example, in a dashboard, via emails or with other communication methods to the worker or distribution center. Automated server corrective actions also may be generated by the intelligence layer 328 with intervention from the worker or distribution center. As should be appreciated, the system-wide intelligence layer 328 in some examples processes safety metrics/data from across multiple locations (e.g., multiple distribution centers or environments), to identify safer environments versus less safe environments company-wide, and uses that data to identify potential solutions, safest methods, and possible changes at the location level that can be made based on the aggregation of all of this individual worker safety information, including motion or action data.

In some examples, motion data from different environments may be used. For example, motion data from a training device for lifting/training in an athletic setting may be analyzed according to the above-described examples. Thus, the analysis performed by the various examples is not limited to a warehouse setting.

Figure 4:
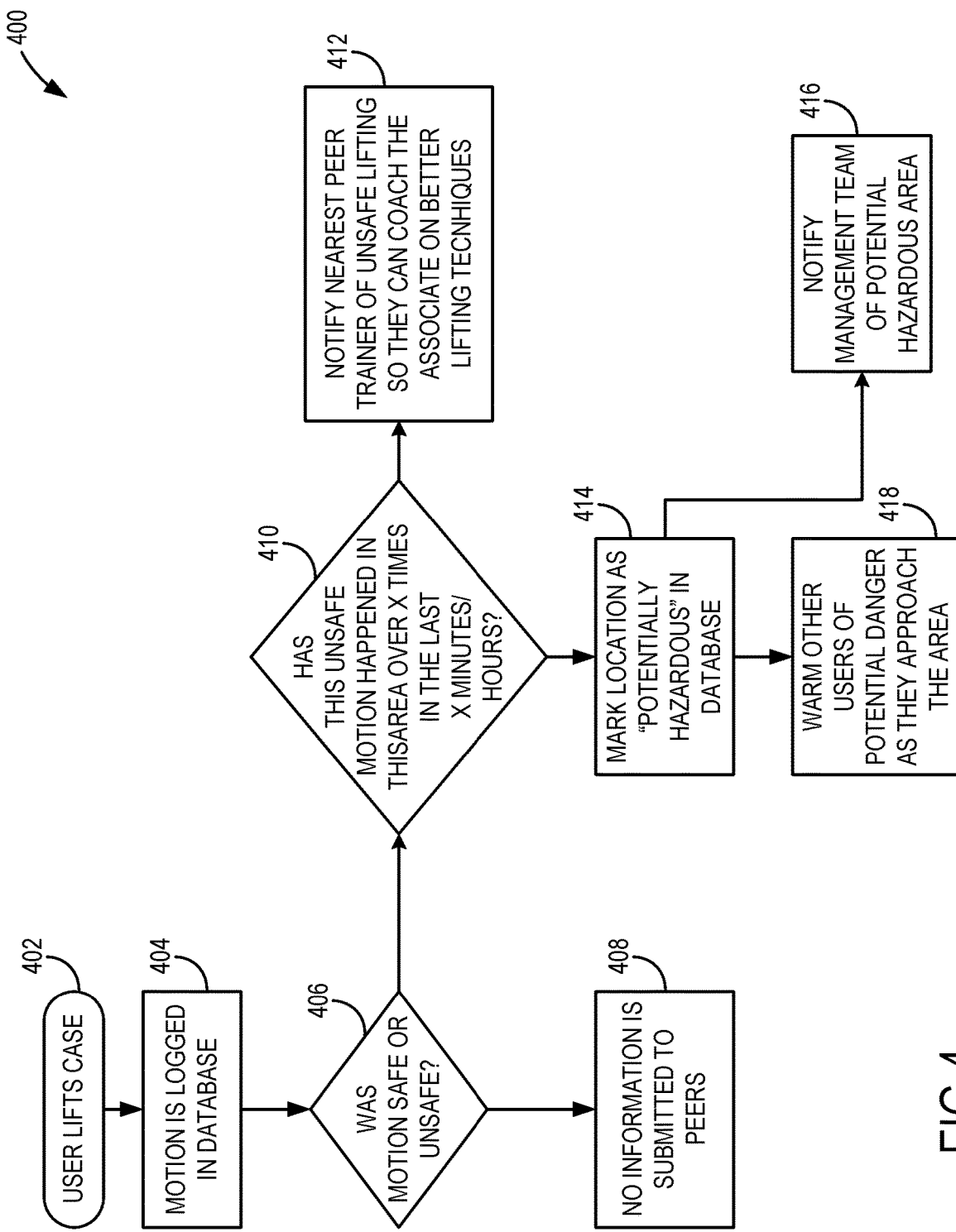
FIG. 4 is an exemplary flowchart of a method for analyzing motion data.

FIG. 4 illustrates a flowchart of a method 400 for improving worker task performance safety. The method 400 may be implemented in connection with the examples illustrated in FIGS. 1-3, which will also be referenced. The process begins when a task or motion is performed, for example, a user lifts a case at 402. For example, the user 112 or worker 202 may begin lifting the container 206 manually using his or her arms or may use a powered device, such as the forklift 208. The motion that performs the lifting task is logged in a database at 404. For example, movement information, such as speed, duration, angle, etc. is stored at the local server 104 and then communicated to the safety monitoring server 102 and stored in the safety information database 108. In some examples, the movement information may be communicated directly to the safety monitoring server 102, which may be located at each of a plurality of locations or remote from the locations.

A determination is the made as to whether the motion was safe based on the logged movement information at 406. For example, based on individualized safety thresholds for the user for the task that is being performed or was performed, a determination is made at 406 to whether one or more of the movement information values exceeds a safety threshold. An unsafe motion may be defined as when one of the values exceeds a threshold or a predefined number of the values of the motion information exceed corresponding thresholds. If the motion is determined to be safe, then no information is communicated, such as to others or peers at 408.

If a determination is made at 406 that the motion is unsafe, then at 410 a determination is made as to whether the unsafe motion has happened in the area over a defined number of times (X number of times) over a defined time period (over the last X minutes or hours). If the determination at 410 is that the unsafe motion has not exceeded the threshold criteria, then a nearest person (e.g., nearest peer trainer or manager) is notified of the unsafe lifting at 412. For example, as described herein, the mobile device 116 may receive notification of the unsafe lift and the manager carrying the mobile device 116 is able to coach or advise the associate on different lifting techniques, for example, improved or safer lifting techniques.

If the determination at 410 is that the unsafe motion has exceeded the threshold criteria, then the location of the motion is marked as "potentially hazardous" or unsafe in a database at 414. For example, the time and unsafe motion may be stored in the safety information database 108. In response, notification is provided, such as to a management team, of the potential hazardous area at 416. Additionally, others may be warned of the potential danger as they approach the area at 418. It should be noted that the notification may also be provided to the worker that performed the unsafe task motion(s). Thus, a safer working environment and improved worker safety may be provided.

ADDITIONAL EXAMPLES

A system for improving worker task performance safety is provided in one example. The system includes at least one transceiver, at least one processor communicatively coupled to the transceiver and at least one memory communicatively coupled to the at least one processor, comprising computer program code. The at least one memory and the computer program code are configured to, with the at least one processor, cause the system to receive worker specific sensor data at the at least one transceiver, identify both a task and at least one worker movement based on the received worker specific sensor data, retrieve at least one task threshold parameter associated with the identified task and ergometric data for a worker related to the identified task and generate at least one worker specific task parameter based on the received worker specific sensor data. The at least one memory and the computer program code are configured to, with the at least one processor, further cause the system to compare the at least one task threshold parameter with the at least one worker specific task parameter, compare the at least one worker movement with the ergometric data for the worker related to the identified task, generate worker specific task data based on the comparison of the at least one task threshold parameter with the at least one worker specific task parameter and identify a change for future worker movement based on the comparison of the at least one worker movement with the ergometric data for the worker related to the identified task.

In another example, a system for improving worker task performance safety is provided. The system includes a plurality of sensors at a plurality of different locations, the plurality of sensors configured to capture worker specific motion data for a plurality of workers at the plurality of different locations and at least one memory to store the captured worker specific motion data and safety metrics. The system further includes a safety monitoring server configured to receive the captured worker specific motion data, the safety monitoring server comprising at least one processor, the at least one memory communicatively coupled to the at least one processor and comprising computer program code. The at least one memory and the computer program code are configured to, with the at least one processor, cause the system to analyze the captured worker specific motion data from the plurality of different locations and the safety metrics to determine a safety level for each of the plurality of different locations and identify at least one of potential solutions, safer methods or possible changes at a location level to be made based on an aggregation of the captured worker specific motion data from the plurality of locations.

In another example, a method for improving worker task performance safety implemented on at least one processor is provided. The method includes receiving worker specific sensor data via a communication network coupled to the at least one processor, identifying both a task and at least one worker movement based on the received worker specific sensor data, retrieving at least one task threshold parameter associated with the identified task and ergometric data for a worker related to the identified task from at least one memory communicatively coupled the processor and generating at least one worker specific task parameter based on the received worker specific sensor. The method also includes comparing the at least one task threshold parameter with the at least one worker specific task parameter, comparing the at least one worker movement with the ergometric data for the worker related to the identified task, generating worker specific task data based on the comparison of the at least one task threshold parameter with the at least one worker specific task parameter and identifying a change for future worker movement based on the comparison of the at least one worker movement with the ergometric data for the worker related to the identified task.

In some examples, the sensor data is received from one or more of the following: an accelerometer, a gyroscope, a suspender system, a tensile sensor, a location sensor, and an infrared sensor.

In some examples, the worker specific sensor data from at least one sensor is attached to or embedded in one or more of the following: a worker belt, a worker glove, a worker shoe, a worker apparel, a clip-on sensor device, a wearable safety device, and workplace equipment.

Alternatively, or in addition to the other examples described herein, examples include a combination of the following:
- identifying the task comprises identifying the task based on the at least one worker movement, and retrieving the at least one task threshold parameter comprises retrieving the at least one task parameter based on the identified at least one worker movement;
- generating the worker specific task data including at least one of a worker performance indicator, a task performance indicator, a task performance adjustment recommendation, an update to a worker performance log, and a safety alert based on the comparison;
- transmitting the worker specific task data to one or more of the following: a worker device and a manager device;
- maintaining a log of worker specific task data associated with a plurality of workers, determining aggregated worker performance data in a specific area based on the log of worker specific task data associated with the specific area, and determining whether the aggregated worker performance is impacted by at least one condition associated with the specific area;
- iteratively repeating receiving worker specific sensor data at the at least one transceiver, identifying a task based on the received worker specific sensor data, retrieving at least one task threshold parameter associated with the identified task, generating at least one worker specific task parameter based on the received worker specific sensor data, comparing the at least one task threshold parameter with the at least one worker specific task parameter, generating worker specific task data based on the comparison, wherein the worker specific task data includes one or more of the following: a worker performance indicator, a task performance indicator, a task performance adjustment recommendation, an update to a worker performance log, a safety alert, worker safety data, worker accident data, worker performance data, and worker injury data, updating a worker performance log with the repeatedly generated worker specific task data, and generating predictive trends associated with the performance of the worker based on an analysis of the worker performance log;
- defining one or more safety thresholds for the at least one task based on the ergometric data, determining whether movement information related to the at least one worker movement exceeds the defined one or more safety thresholds, and generating a key performance indicator for the worker based on the comparison of the at least one worker movement with the ergometric data for the worker related to the identified task and the one or more safety thresholds;

generating an output, including one of a dashboard or an electronic communication, based on the analyzed captured worker specific motion data;

automatically generating a corrective action based on the identified at one of potential solutions, safer methods or possible changes at the location level; and analyzing the captured worker specific motion data from the plurality of different locations and the safety metrics using item details for movement associated with the worker specific motion data.

At least a portion of the functionality of the various elements in FIG. 1, FIG. 2, FIG. 3, FIG. 4, and FIG. 5 may be performed by other elements in FIG. 1, FIG. 2, FIG. 3, FIG. 4, and FIG. 5, or an entity (e.g., processor, web service, server, application program, computing device, etc.) not shown in FIG. 1, FIG. 2, FIG. 3, FIG. 4 or FIG. 5.

In some examples, the operations illustrated in FIG. 3 or FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 5:
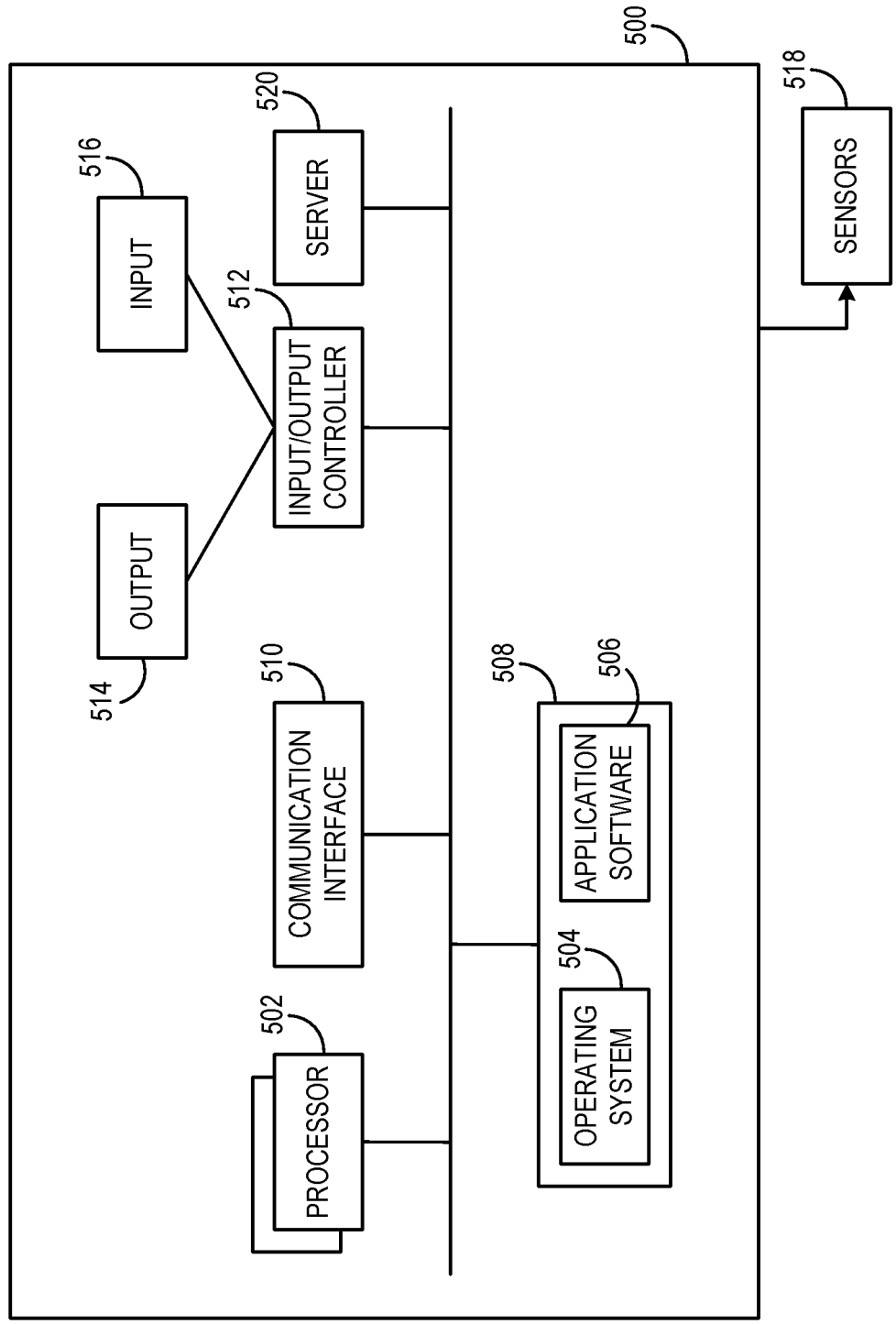
FIG. 5 is an exemplary block diagram illustrating a computing apparatus according to an embodiment as a functional block diagram.

FIG. 5 illustrates a computing apparatus 500 according to an embodiment as a functional block diagram. In an embodiment, components of the computing apparatus 500 may be implemented as a part of an electronic device and/or computing device according to one or more embodiments described in this specification. The computing apparatus 500 comprises one or more processors 502 which may be microprocessors, controllers or any other suitable type of processors for processing computer executable instructions to control the operation of the electronic device. Platform software comprising an operating system 504 or any other suitable platform software may be provided on the computing apparatus 500 to enable application software 506 to be executed on the computing apparatus 500. According to an embodiment, receiving motion data, analyzing the motion data and identifying unsafe motions or conditions may be accomplished by software. Furthermore, the computing apparatus 500 may receive network communications from other computing devices via a network or other type of communication link resume data, candidate selection data, or the like.

Computer executable instructions may be provided using any computer-readable media that are accessible by the computing apparatus 500. Computer-readable media may include, for example, computer storage media such as a memory 508 and communications media. Computer storage media, such as a memory 508, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 508) is shown within the computing apparatus 500, it will be appreciated by a person skilled in the art, that the storage may be distributed or located remotely and accessed via a network or other communication link (e.g. using a communication interface 510).

The computing apparatus 500 may comprise an input/output controller 512 configured to output information to one or more output devices 514, for example a display or a speaker, which may be separate from or integral to the electronic device. The input/output controller 512 may also be configured to receive and process an input from one or more input devices 516, for example, a keyboard, a microphone or a touchpad. In one embodiment, the output device 514 may also act as the input device. An example of such a device may be a touch sensitive display. The input/output controller 512 may also output data to devices other than the output device, e.g. a locally connected printing device.

The computing apparatus 500 also includes a server 520, which may be configured as the safety monitoring server 102 (shown in FIG. 1). The server 520 is configured to received motion data, such as from one or more sensors 518 attached to a worker or equipment, and process the motion data to determine location-specific or worker-specific unsafe conditions, as well as identify potential changes for future motions.

The functionality described herein can be performed, at least in part, by one or more hardware logic components. According to an embodiment, the computing apparatus 600 is configured by the program code when executed by the one or more processors 502 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a client device, server device, personal computer, or the like, these are only examples of a device and not a limitation. As those skilled in the art will appreciate, the present embodiments are suitable for application in a variety of different types of devices, such as conventional computing devices, portable and mobile devices, laptop computers, tablet computers, etc.

Although described in connection with an exemplary computing system environment, examples of the disclosure are capable of implementation with numerous other general purpose or special purpose computing system environments, configurations, or devices.

Any range or device value given herein may be extended or altered without losing the effect sought, as will be apparent to the skilled person.

The embodiments illustrated and described herein as well as embodiments not specifically described herein but within the scope of aspects of the claims constitute exemplary means for processing motion data. The illustrated one or more processors 502 together with the computer program code stored in the memory 508 constitute exemplary processing means for receiving motion data, processing the motion data and determining unsafe motions or conditions.

Examples of the disclosure may be described in the context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized resource-related task allocation. For example, the elements illustrated in FIG. 1, FIG. 2, and FIG. 5 such as when encoded to perform the operations illustrated in FIG. 3 and FIG. 4 constitute exemplary means for analyzing motion data to improve worker task performance safety.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

The term "comprising" is used in this specification to mean including the feature(s) or act(s) followed thereafter, without excluding the presence of one or more additional features or acts. Furthermore, when introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for improving worker task performance safety, the system comprising:
   at least one transceiver;
   at least one processor communicatively coupled to the transceiver;
   at least one memory communicatively coupled to the at least one processor, comprising computer program code, the at least one memory and the computer program code configured to, with the at least one processor, cause the system to:
   receive worker specific sensor data associated with a specific area of an individual facility at the at least one transceiver;
   identify both a task and at least one worker movement based on the received worker specific sensor data;
   retrieve at least one task threshold parameter associated with the identified task and ergometric data for a worker related to the identified task;
   generate at least one worker specific task parameter based on the received worker specific sensor data;
   compare the at least one task threshold parameter with the at least one worker specific task parameter;
   compare the at least one worker movement with the ergometric data for the worker related to the identified task;
   generate worker specific task data based on the comparison of the at least one task threshold parameter with the at least one worker specific task parameter; and
   identify a change for future worker movement based on the comparison of the at least one worker movement with the ergometric data for the worker related to the identified task;
   maintain a log of worker specific task data associated with a plurality of workers;
   determine aggregated worker performance data in the specific area of the individual facility based on the log of worker specific task data associated with the specific area;
   determine whether the aggregated worker performance has exceeded a threshold criteria related to at least one condition associated with the specific area of the individual facility; and
   responsive to the determination that the aggregated worker performance has exceeded the threshold criteria, marking the specific area of the individual facility as an unsafe location in a database.

2. The system of claim 1, wherein responsive to marking the specific area as the unsafe location in the database, generating a notification of the unsafe location.

3. The system of claim 1, wherein the at least one processor causes the system to receive the worker specific sensor data from at least one sensor attached to or embedded in one or more of the following: a worker belt, a worker glove, a worker shoe, a worker apparel, a clip-on sensor device, a wearable safety device, and workplace equipment.

4. The system of claim 1, wherein
identifying the task comprises identifying the task based on the at least one worker movement; and
retrieving the at least one task threshold parameter comprises retrieving the at least one task parameter based on the identified at least one worker movement.

5. The system of claim 1, wherein the at least one processor causes the system to generate the worker specific task data including at least one of a worker performance indicator, a task performance indicator, a task performance adjustment recommendation, an update to a worker performance log, and a safety alert based on the comparison.

6. The system of claim 1, wherein the at least one processor further causes the system to transmit the worker specific task data to one or more of the following: a worker device and a manager device.

7. The system of claim 1, wherein the at least one processor further causes the system to receive the worker specific sensor data from workplace equipment, wherein the worker specific sensor data includes equipment specific sensor data associated with the workplace equipment that the worker is associated with or using.

8. The system of claim 1, wherein the at least one processor further causes the system to:
iteratively repeat:
receiving worker specific sensor data at the at least one transceiver;
identifying a task based on the received worker specific sensor data;
retrieving at least one task threshold parameter associated with the identified task;
generating at least one worker specific task parameter based on the received worker specific sensor data;
comparing the at least one task threshold parameter with the at least one worker specific task parameter; and
generating worker specific task data based on the comparison, wherein the worker specific task data includes one or more of the following: a worker performance indicator, a task performance indicator, a task performance adjustment recommendation, an update to a worker performance log, a safety alert, worker safety data, worker accident data, worker performance data, and worker injury data;
updating a worker performance log with the repeatedly generated worker specific task data; and
generating predictive trends associated with the performance of the worker based on an analysis of the worker performance log.

9. The system of claim 1, wherein the at least one processor further causes the system to:
define one or more safety thresholds for the at least one task based on the ergometric data;
determine whether movement information related to the at least one worker movement exceeds the defined one or more safety thresholds; and
generate a key performance indicator for the worker based on the comparison of the at least one worker movement with the ergometric data for the worker related to the identified task and the one or more safety thresholds.

10. A method for improving worker task performance safety implemented on at least one processor, comprising:
receiving worker specific sensor data via a communication network coupled to the at least one processor;
identifying a task, a specific location of an individual facility, and at least one worker movement based on the received worker specific sensor data;
retrieving at least one task threshold parameter associated with the identified task and ergometric data for a worker related to the identified task from at least one memory communicatively coupled the processor;
generating at least one worker specific task parameter based on the received worker specific sensor data;
comparing the at least one task threshold parameter with the at least one worker specific task parameter;
comparing the at least one worker movement with the ergometric data for the worker related to the identified task;
generating worker specific task data based on the comparison of the at least one task threshold parameter with the at least one worker specific task parameter;
determining whether the worker specific task data exceeds a safety threshold;
responsive to the worker specific task data exceeding the safety threshold, determining whether the identified specific location of the individual facility is associated with other worker specific task data exceeding the safety threshold;
responsive to the identified specific location of the individual facility being associated with the other worker specific task data exceeding the safety threshold, labeling the identified specific location as potentially unsafe in a database based on the worker specific task data and the other worker specific task data exceeding the safety threshold; and
identifying a change for future worker movement based on the comparison of the at least one worker movement with the ergometric data for the worker related to the identified task.

11. The method of claim 10, wherein receiving the worker specific sensor data comprises:
receiving the worker specific data from at least one sensor embedded in one or more of the following: a worker belt, a worker glove, a worker shoe, a worker apparel, a clip-on sensor device, a wearable safety device, and workplace equipment; and
transmitting the worker specific task data to one or more of the following: a worker device and a manager device.

12. The method of claim 10, further comprising:
identifying at least one worker movement based on the received worker specific sensor data and wherein:
identifying the task comprises identifying the task based on the at least one worker movement; and
retrieving the at least one task threshold parameter comprises retrieving the at least one task parameter based on the identified at least one worker movement.

13. The method of claim 10, wherein generating worker specific task data based on the comparison comprises:
generating the worker specific task data including at least one of a worker performance indicator, a task performance indicator, a task performance adjustment recommendation, an update to a worker performance log, and a safety alert based on the comparison.

14. The method of claim 10, further comprising:
maintaining a log of worker specific task data associated with a plurality of workers;
determining aggregated worker performance data in a specific area based on the log of worker specific task data associated with the specific area; and determining whether the aggregated worker performance data is impacted by at least one condition associated with the specific area.

15. A non-transitory computer-readable storage medium having computer-executable instructions for improving worker task performance safety, the computer-executable instructions operable to, upon execution by a computer, cause the computer to:
receive worker specific sensor data via a communication network coupled to the at least one processor;
identify a task, a specific location of an individual facility, and at least one worker movement based on the received worker specific sensor data;
retrieve at least one task threshold parameter associated with the identified task and ergometric data for a worker related to the identified task from at least one memory communicatively coupled the processor;
generate at least one worker specific task parameter based on the received worker specific sensor data;
compare the at least one task threshold parameter with the at least one worker specific task parameter;
compare the at least one worker movement with the ergometric data for the worker related to the identified task;
generate worker specific task data based on the comparison of the at least one task threshold parameter with the at least one worker specific task parameter;
determine whether the worker specific task data exceeds a safety threshold;
responsive to the worker specific task data exceeding the safety threshold, determine whether the identified specific location of the individual facility is associated with other worker specific task data exceeding the safety threshold;
responsive to the identified specific location of the individual facility being associated with the other worker specific task data exceeding the safety threshold, label the identified specific location as potentially unsafe in a database based on the worker specific task data and the other worker specific task data exceeding the safety threshold; and
identify a change for future worker movement based on the comparison of the at least one worker movement with the ergometric data for the worker related to the identified task.

16. The non-transitory computer-readable storage medium of claim 15, wherein receiving the worker specific sensor data further comprises computer-executable instructions operable to, upon execution by a computer, cause the computer to:
receive the worker specific data from at least one sensor embedded in one or more of the following: a worker belt, a worker glove, a worker shoe, a worker apparel, a clip-on sensor device, a wearable safety device, and workplace equipment; and
transmit the worker specific task data to one or more of the following: a worker device and a manager device.

17. The non-transitory computer-readable storage medium of claim 15, further comprising computer-executable instructions operable to, upon execution by a computer, cause the computer to:
identify at least one worker movement based on the received worker specific sensor data, wherein identifying the task comprises identifying the task based on the at least one worker movement; and
retrieve the at least one task threshold parameter comprises retrieving the at least one task parameter based on the identified at least one worker movement.

18. The non-transitory computer-readable storage medium of claim 15, further comprising computer-executable instructions operable to, upon execution by a computer, cause the computer to:
generate the worker specific task data including at least one of a worker performance indicator, a task performance indicator, a task performance adjustment recommendation, an update to a worker performance log, and a safety alert based on the comparison.

19. The non-transitory computer-readable storage medium of claim 15, further comprising computer-executable instructions operable to, upon execution by a computer, cause the computer to:
maintain a log of worker specific task data associated with a plurality of workers;
determine aggregated worker performance data in a specific area based on the log of worker specific task data associated with the specific area; and
determine whether the aggregated worker performance data is impacted by at least one condition associated with the specific area.

\* \* \* \* \*